United States Patent [19]

Gillbrand et al.

[11] Patent Number: 5,335,743

[45] Date of Patent: Aug. 9, 1994

[54] OPERATION OF SERVO DEVICES FOR DRIVING A MOTOR VEHICLE - CONTROL, ARRANGEMENT AND METHOD

[75] Inventors: Per Gillbrand, Mariefred; Hans Johansson, Amal; Per Johansson, Amal; Bengt Elgh, Amal, all of Sweden

[73] Assignee: Saab Automobile Aktiebolag, Sweden

[21] Appl. No.: 39,362

[22] PCT Filed: Oct. 15, 1991

[86] PCT No.: PCT/SE91/00689

§ 371 Date: Apr. 16, 1993

§ 102(e) Date: Apr. 16, 1993

[87] PCT Pub. No.: WO92/06860

PCT Pub. Date: Apr. 30, 1992

[30] Foreign Application Priority Data

Oct. 19, 1990 [SE] Sweden ............... 9003318-4

[51] Int. Cl.$^5$ ............... B60K 26/02; B60K 41/28; B60K 31/02; G05G 9/02
[52] U.S. Cl. ............... 180/178; 180/333; 180/335; 180/336; 180/170; 200/61.54
[58] Field of Search ............ 180/333, 335, 336, 170, 180/178, 179; 200/61.54, 61.55, 61.56, 61.57; 364/424.1, 426.04; 74/552

[56] References Cited

U.S. PATENT DOCUMENTS

| | | |
|---|---|---|
| 1,556,885 | 10/1925 | Whyte . |
| 2,777,335 | 1/1957 | Engberg et al. ............... 74/481 |
| 4,476,954 | 10/1984 | Johnson et al. ............... 180/333 |
| 4,604,912 | 8/1986 | Sugita et al. ............... 200/61.54 X |
| 4,701,629 | 10/1987 | Citroen ............... 180/333 X |
| 4,924,960 | 5/1990 | Crill ............... 180/333 |
| 5,086,870 | 2/1992 | Bolduc ............... 180/333 |
| 5,197,563 | 3/1993 | Sakonju et al. ............... 180/179 X |

FOREIGN PATENT DOCUMENTS

| | | |
|---|---|---|
| 0069090 | 1/1983 | European Pat. Off. . |
| 2841786 | 6/1979 | Fed. Rep. of Germany . |
| 3941665 | 6/1991 | Fed. Rep. of Germany ...... 180/336 |
| 4310435 | 11/1992 | Japan ............... 180/170 |

Primary Examiner—Margaret A. Focarino
Assistant Examiner—Peter English
Attorney, Agent, or Firm—Ostrolenk, Faber, Gerb & Soffen

[57] ABSTRACT

A steering wheel (11) is fitted with a control (13) which, when operated in mutually independent control directions (41–45), controls the acceleration and deceleration of the vehicle, as well as upward and downward gear changing, and activates one of a number of cruise control functions. The control (13) may preferably be mounted immediately adjacent to the steering wheel rim (15) on the upper side of a wheel spoke (12), so that it may readily be operated by the driver's thumb without the necessity of releasing the grip on the wheel. Thus, the control incorporates all of the most essential driving control functions. The control according to the present invention encourages the driver to select, at an early stage, those accelerator and gear-change parameters which are most advantageous to economic driving or are most suited to the prevailing traffic conditions, the control actions required involving a minimum of manual movements. The present invention also relates to an arrangement and a method of controlling servo devices for the driving of a motor vehicle, utilizing the control (13) mounted on the steering wheel.

20 Claims, 2 Drawing Sheets

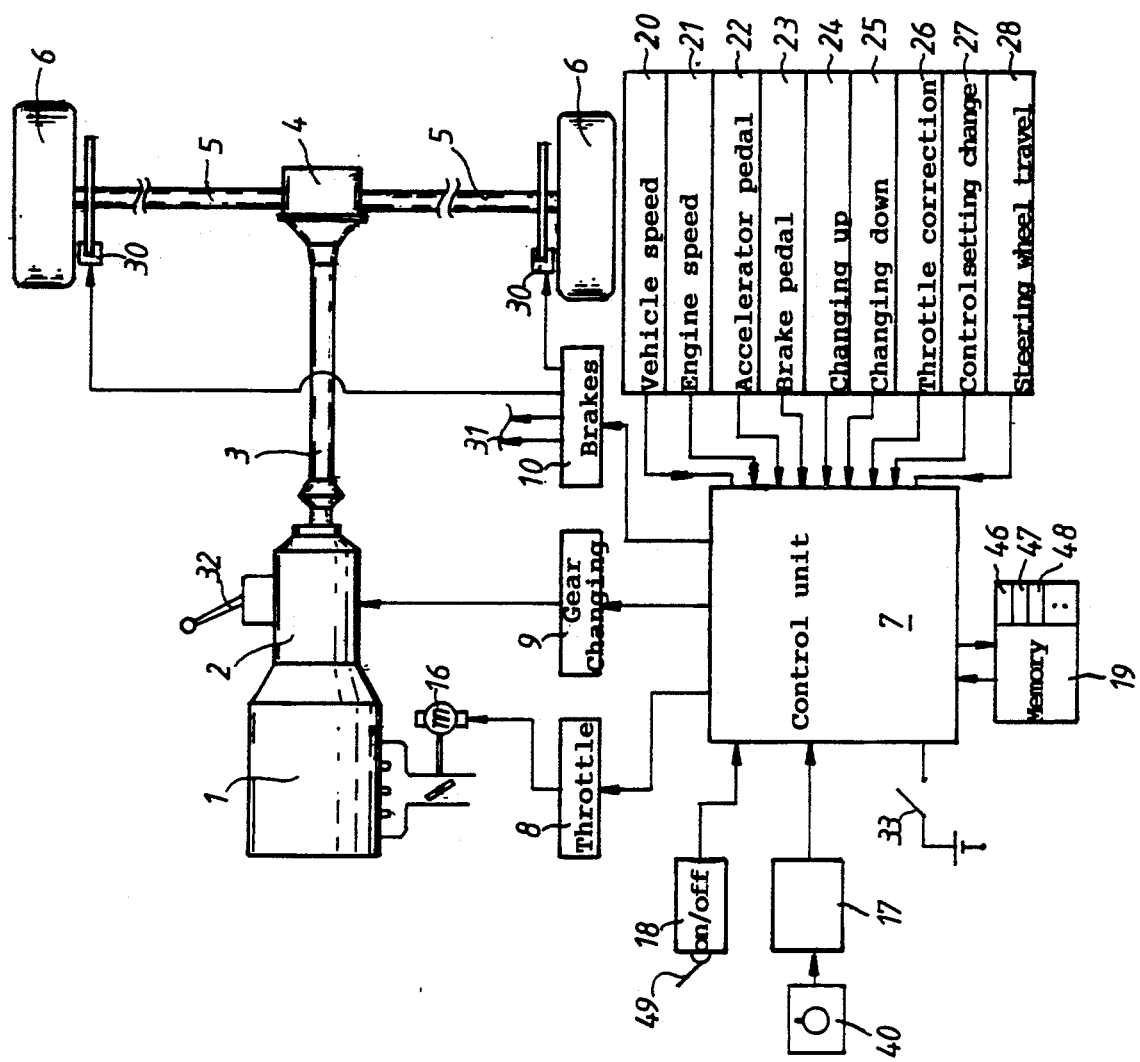

OPERATION OF SERVO DEVICES FOR DRIVING A MOTOR VEHICLE - CONTROL, ARRANGEMENT AND METHOD

The present invention relates to a motor vehicle control device, a vehicle control arrangement incorporating said device, and a vehicle control method based on said arrangement. More specifically, the control device, arrangement and method are intended preferably for motor vehicles fitted with a steering wheel, in which the control device is mounted on the steering wheel such as to be accessible for manual operation by the driver and in which the control device controls the operation of both the accelerator and gear change functions in a simple and safe manner to promote safe and economical driving.

STATE OF THE ART

Numerous methods of operating the accelerator, gearbox and brakes of motor vehicles are known. A foot pedal is the commonest means of operating the accelerator in a car, truck or bus powered by an internal combustion engine, regardless of whether the engine drives the wheels through a manual gearbox or automatic transmission. In some instances, this control may be augmented by means of maintaining a constant road speed, in the form of a 'cruise control' (CC) function, usually operated by a lever mounted on the steering column. When activated by manual operation of the lever, the function controls the throttle in such manner that it strives to maintain the speed of the vehicle constant at the value prevailing at the instant of operation. In some instances, the cruise control lever may also incorporate throttle control functions for decelerating or accelerating the vehicle. Deceleration is achieved by abrupt closure of the throttle and acceleration by abrupt opening of the throttle to a predetermined, constant position.

Manual accelerator controls mounted on or integral with the steering wheel have been used in motor vehicles modified for handicapped persons mainly to meet the requirements of drivers whose legs are paralyzed. Examples of controls mounted on the steering wheel are disclosed in Patent Applications DE,A,2841786 and EP,A,-69090.

A brake control function can also be incorporated in this type of accelerator control in vehicles modified for handicap persons, as disclosed in Patent Application EP,A,200769 and U.S. Pat. No. 4,496,018.

U.S. Pat. No. 4,077,487 discloses a variant with a secondary manual brake control, mounted on the steering wheel and permitting manual operation of the brakes.

Many of the controls devised to date have necessitated control actions involving large movements, requiring the use of the complete arm or foot, or have failed to take account of all of the control actions need to ensure that the vehicle is driven in a controlled manner.

In general, wheel-mounted brake and/or accelerator controls, as used primarily in vehicles modified for handicapped persons, have been installed in vehicles with automatic transmissions. In this context, automatic transmissions suffer from the inherent disadvantage that a gear change initiated by the driver by means of the kickdown function takes place only when the engine speed has increased. On the other hand, changing gear by manual operation of the gear selector lever requires the driver to remove his hand from the wheel.

SUMMARY OF THE INVENTION

The object of the invention is to improve and simplify the control functions available to the driver, mainly those required to operate the engine and gearbox, by providing him with a readily accessible and ergonomically designed control device affording control of those operating systems necessary for driving the vehicle.

Combining the accelerator and gear-change controls in one and the same unit, using different thumb grips to operate each, and mounting the control on the steering wheel, affords a control system which is extremely practical for long-distance driving, and which does not require the driver to release his grip on the steering wheel to operate the control, or to move one or both of his feet from pedal to pedal.

In accordance with the present invention, the control is mounted on the steering wheel of the motor vehicle such as to be manually operable by one of the driver's fingers while the driver's hand maintains its grip on the steering wheel. A first signal generating means, responsive to manual operation by the driver's finger, is provided for transmitting a first control signal to a first servo device to control acceleration of the motor vehicle. A second signal generating means, responsive to manual operation by the driver's finger, is provided for transmitting a second control signal to a second servo device to initiate changing of gears in the vehicle's transmission.

An arrangement for controlling a motor vehicle in accordance with the present invention includes first and second servo devices for respectively controlling operation of the throttle and the gear box of the motor vehicle. An operating unit is mounted on the steering wheel such as to be manually operable by one of the driver's fingers while the driver's hand maintains its grip on the steering wheel. The operating unit includes first and second pressure sensors operable respectively in response to pressure from the driver's finger representing a change in acceleration to generate a first electrical signal, and in response to pressure of the driver's finger representing a change of gears to generate a second electrical signal. Control means responsive to the first electrical signal actuate a first servo device to control acceleration of the engine. In response to the second electrical signal, the control means actuates the second servo device to control operation of the gear box to initiate and execute gear changes.

A method for controlling a motor vehicle in accordance with the present invention in which the motor vehicle includes an arrangement as discussed in the previous paragraph, and wherein the operating unit includes first, second, third and fourth finger grips for generating electrical signals proportionate to the amount of pressure applied thereto, includes the steps of operating the first finger grip to produce an increase in acceleration, operating the second finger grip to produce a decrease in acceleration, operating the third finger grip to cause upward gear changes in the gear box in a number of individual steps and operating the fourth finger grip to produce downward gear changes in a number of individual steps.

Mounting the control on a steering wheel spoke immediately adjacent to the rim enables the accelerator and brake functions to be operated by a single thumb action, using a separate and distinct thumb grip for each function, without the necessity of releasing the grip on the wheel.

In one embodiment, the control incorporates an accelerator control function which is proportional to the pressure applied to the control device. This enables the unit to be designed so that control is feasible without the need for large control movements to make fine adjustments to the throttle setting. This is an advantage in that it eliminates the necessity of releasing the grip on the steering wheel to perform major accelerator adjustments, and provides the driver with direct feedback regarding the accelerator position without taking his eyes from the road.

The control, the system in which it is used and the method of control employed in this invention simplify the engine control and gear-change facilities available to the driver. In a left-hand drive car with the control mounted on the left-hand steering wheel spoke, which joins the rim at the point normally gripped by the left hand, the driver can exercise complete control over the vehicle with that hand, enabling him to use his right hand, as required, to operate other functions, such as the radio or air conditioning. Thus, the left hand may be used to grip the steering wheel, using the thumb for complete accelerator control, exactly as provided by a conventional pedal, and for performing gear changes.

Another object of the invention, in addition to control of the accelerator and gear-change functions, is to enable the driver to operate the brakes. As one suitable method, the braking control function may be activated when the pressure applied to the control to decelerate the vehicle exceeds a preset value, at which the throttle is completely closed. The braking effort applied will be proportional to the differential between the preset and actual pressures.

Thus, since both accelerator control and, if applicable, brake control following closure of the throttle, will be directly related to the pressure applied by the driver, the latter will be in full control of these functions. Furthermore, to provide the driver with immediate confirmation that a gear change has been effected by operation of the appropriate gear-change thumb grip in the control, the latter incorporates pressure-point devices which act on these thumb grips. The driver senses the pressure point directly in the finger or thumb, enabling him to repeat the operation in quick succession if several gear changes are required.

To further enhance total driving control, the same control is used for accelerator control up to a predetermined vehicle speed. In this case, operation of an additional thumb grip, separate from the gear-change and accelerator thumb grips, enables the driver to select one of a number of preselected speeds. For convenience, the values may be preselected so that the first represents a minimum speed limit, the second the next higher limit, and so on. Engagement of the appropriate preselected speed may be performed by repeated operation of the thumb grip, preferably against a pressure-point device, one operation selecting the first value, two operations the second, and so on.

The invention represents a major advance in enabling a driver to control the vehicle manually, using a minimum of muscular effort while maintaining a relaxed driving posture. Comfort and safety are enhanced by the fact that the driver can quickly select the gear and throttle setting required at any particular instant.

The invention is based on the premise that the driver is the first to realize when a gear-change or accelerator operation is required. In addition, it is useful to the driver, firstly, to perform gear changing before the need arises (as occurs frequently under critical circumstances, especially when overtaking) and, secondly, as driver, to decide independently on the necessity of gear changing and the degree of accelerator operation required. This enhances driving enjoyment and eliminates the risks inherent in driving a car with an overly automated engine and gearbox/transmission control system, which may have an adverse effect on the driver's concentration on long-distance journeys.

The combined control which is used in this invention, and which is mounted on the steering wheel, affords a more efficient, more reliable and co-ordinated control procedure, allowing the driver to perform intentional control actions by means of slight movements of the thumb of the hand gripping the steering wheel, unlike controls of the conventional type, which require an entire arm, or one or both legs, to be used to perform control actions as and when necessary.

Other characteristic features and advantages are detailed in the appended claims and in the following description of one version of the control according to the invention, the arrangement in which said control is incorporated, and the method whereby said arrangement is used for driving the vehicle. The description refers to the accompanying figures.

BRIEF DESCRIPTION OF THE DRAWINGS

FIG. 4 shows an arrangement for controlling the accelerator, gear-change and braking functions of the vehicle by means of a control as described in FIGS. 1-3.

DESCRIPTION OF ONE EMBODIMENT

Figure 1:
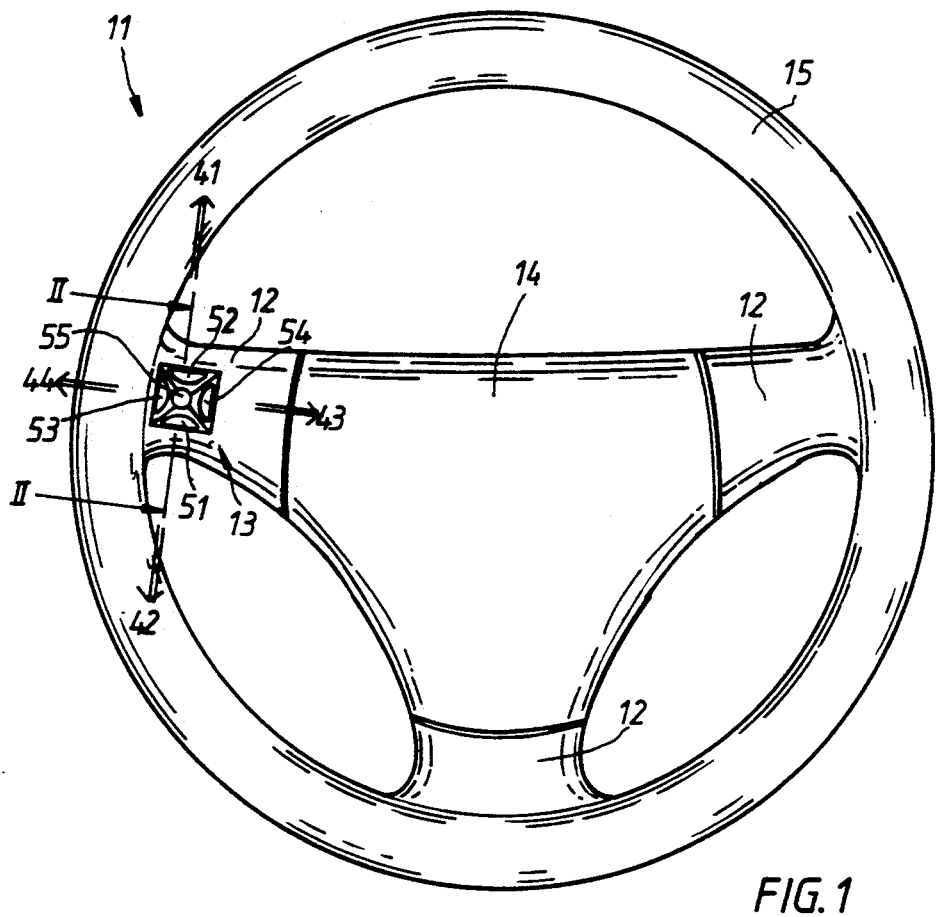
FIG. 1 shows a vehicle steering wheel with a control mounted on one of the wheel spokes for driving control purposes.

FIG. 1 shows one version of a control 13 according to the invention mounted on a steering device, preferably a steering wheel 11. The steering wheel conventionally consists of a rim 15, which is connected to the hub by two or more spokes 12. The hub carries a spring-loaded cover 14 which, when pressed, may activate a signal horn. The control 13 is mounted on top of one spoke 12, in immediate proximity to the rim 15, enabling it (the control) to be operated, for example, by the thumb while the driver maintains his grip on the steering wheel rim. In the version illustrated, the control is mounted on the left-hand spoke. This is advantageous in left-hand drive vehicles, in which various other controls, such as a gear lever, radio, air conditioning panel etc., which require to be operated frequently with the right hand while the car is being driven, are usually located to the right of, and at a distance from, the steering wheel 11, on an instrument panel or centre console. The control 13 is tiltable in four directions 41–44 in a plane parallel to the plane of the steering wheel 11. The control directions are arranged in opposite pairs, so that in one pair 41, 42, a first control direction 41 is opposed to a second control direction 42, and in another pair 43, 44, a third control direction 43 is opposed to a fourth control direction 44, the individual pairs 41, 42 and 43, 44 being essentially at right-angles to each other.

To permit manual operation in each of the control directions 41–44, the control is provided with thumb grips 51–54, which consist of concave depressions in the sides of a tetrahedral button 34 mounted on top of the upper arm 35 of the control 13. The application of pressure to thumb grip 51 enables the control to be operated in control direction 41. Similarly, operation in directions 42–44 is achieved by applying pressure to thumb grips 52–54 respectively.

Thus, for driving control purposes, directions 41 and 42 are used respectively to open and close the engine throttle, and directions 43 and 44 used to change gear, upward and downward respectively, in relation to the gear engaged at the particular instant. In one suitable version of the control, the tetrahedral button 34 on the control 13 is truncated and is provided with a fifth thumb grip 55, consisting of a concave depression in the truncated section and located in a plane parallel to that of the steering wheel 11. In this instance, the control is also operable in a fifth control direction 45 (see FIGS. 2 and 3) normal to the plane of the steering wheel. Operation of thumb grip 55 in control direction 45 may be used to actuate a cruise control function for driving control purposes.

Figure 2:
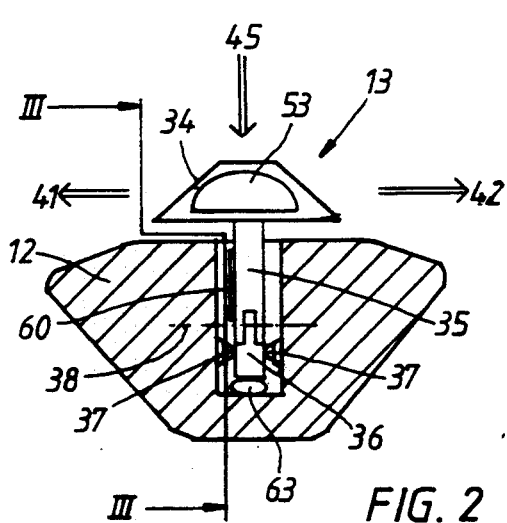
FIG. 2 is a cross-section through the control along section line II—II shown in FIG. 1.
Figure 3:
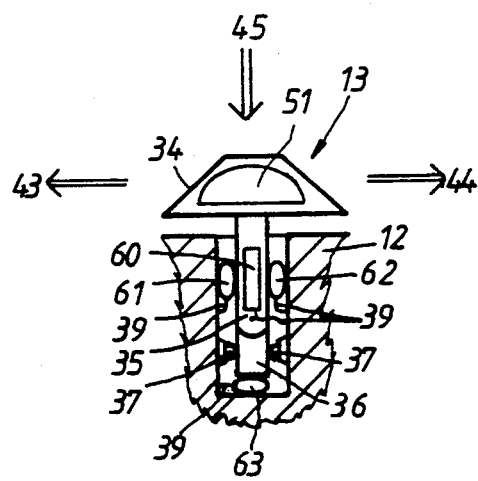
FIG. 3 is a partial cross-section through the control along section line III—III shown in FIG. 2.

To illustrate how the control signals for each of the control directions 41–45 are generated with the aid of the control 13, a basic model of the design is shown in FIGS. 2 and 3. In the figures, the characteristic design features of the device have been exaggerated in comparison with an actual control, the design of which is smaller and more compact. FIG. 2 is a cross-section of the control along section line II—II in FIG. 1, through the left-hand spoke 12 of the steering wheel. Thus, for accelerator control, the control is movable in control directions 41 and 42, respectively opening and closing the throttle. A device such as a strain gauge 60, mounted on the upper arm 35 of the control, may be used to obtain a control signal proportional to the pressure applied by the driver to thumb grips 51 and 52. Since the lower arm 36 of control 13 is located laterally by supporting slide bearings 37 in the recess in the wheel spoke 12 and is attached to device 63 (which will be described in further detail below) at the bottom of the recess, the upper arm 35 will be subjected to bending when thumb grips 51 and 52 are operated in control directions 41 and 42 respectively. When the control is released, the upper arm 35 will resume its original shape and the control will be returned to the neutral position. The upper arm 35 of the control 13 should preferably be manufactured from a polymer material possessing a certain flexibility, and should be of a design and size suitable for the forces required to achieve accelerator control from minimum to maximum throttle opening, within the space provided for bending given in the recess in the wheel spoke. The upper arm 35 should preferably be of square cross-section, with the strain gauge 60 attached to one of the side surfaces situated in a plane at right angles to control directions 41, 42. Bending of the upper arm 35 in directions 41 and 42 will cause the strain gauge 60 to be compressed and elongated respectively, producing a signal proportional to the degree of bending and, therefore, to the pressure exerted on thumb grip 51 or 52 as appropriate.

In one alternative embodiment (not illustrated), a second strain gauge may be attached to the opposite side of the upper arm 35 to strain gauge 60. In this case, each device may be used to detect elongation only i.e. the gauges may be used to detect bending of upper arm 35 in each control direction individually. For example, gauge 60 may be used to detect bending in control direction 42 only, while the second gauge may be used to detect bending in control direction 41. The use of two strain gauges also enables the control signals from the strain gauges to be modified electrically to produce a non-governing signal level when the control is in the neutral/start position, in which it must not deliver a control signal. Such control signal may otherwise result from the use of two individual gauges possessing mutually different characteristics when the control is in neutral. Other alternative versions (not illustrated) may utilise potentiometers to generate a control signal proportional to the physical position of control 13 in control directions 41, 42, the upper arm 35 being designed to pivot in these directions in opposition to separate spring-loaded devices. In these cases, the control, when released, is returned to the neutral position with the aid of the spring-loaded devices, which thus comprise the return mechanism.

For the purpose of controlling a cruise control function, the control 13 is movable in control direction 45 in opposition to a diaphragm switch 63 attached, for example by bonding, to the bottom of the recess and to the lower arm 36 of the control. The use of a conventional diaphragm switch enables a defined pressure point to be obtained when the fifth thumb grip 55 is operated in control direction 45. On passing the pressure point, the diaphragm switch operates, closing an electrical circuit to produce a signal which is used to activate the cruise control function. When the control is operated in control direction 45, the upper arm 35 and the lower arm 36 of the control are pressed downwards against the diaphragm switch 63, sliding between the supporting slide bearings 37. Consequently, the tetrahedral button 34 on top of the control is mounted above the upper surface of the steering wheel spoke 12 by a distance slightly exceeding the amount by which the diaphragm switch can be compressed on passing the pressure point.

The devices used for upward and downward gear changing when the control is operated in directions 43 and 44 are illustrated in FIG. 3. The upper arm 35 of the control 13 is connected to the lower arm 36 by a pivot 38. This arrangement enables the upper arm to be tilted, firstly, in control direction 43 (to the left in FIG. 3 and inward towards the steering wheel hub in FIG. 1), acting on a second diaphragm switch 61 and, secondly, in control direction 44 (to the right in FIG. 3 and radially outward from the wheel hub in FIG. 1), acting on a third diaphragm switch 62. Since diaphragm switches 61 and 62 should preferably be attached only to the wall of the recess in the spoke 12, neither will be subject to a pulling force when the control is operated in the opposite control direction. Diaphragm switches 61, 62 enable a defined pressure point to be obtained when the third and fourth thumb grips 53 and 54 are operated in control directions 43 and 44 respectively. Diaphragm switch 61 is operated when the control 13 is moved in control direction 43. On passing the pressure point, the diaphragm switch operates, closing an electrical circuit to produce a signal which is used to initiate an upward gear change in relation to the gear engaged at that particular instant. Diaphragm switch 62 is operated when the control 13 is moved in control direction 44. On passing the pressure point, the diaphragm switch operates, closing an electrical circuit to produce a signal which is used to initiate a downward gear change in relation to the gear engaged at that particular instant.

To ensure that only the upper arm 35 of the control turns about its pivot 38, the lower arm 36 is fixed in position laterally by slide bearings 37.

Sensors (strain gauges and diaphragm switches) 60–63 are also connected by signal leads 39 to a control unit, which actuates the various servos as appropriate. The leads may be run through the steering wheel 11 in a number of different manners to a transfer device on the steering column, from whence they are connected to the control unit. The transfer device may consist of a number of conductor loops providing an additional length of lead which is reeled and unreeled as the steering wheel is turned, an alternative type employing wiper contacts or an optical signal transfer device.

The control 13 located on the left-hand steering wheel spoke 12 and control directions 41–45 may, therefore, be used to control the accelerator and gearchange functions as follows: An increase in acceleration may be achieved by pressing thumb grip 51 upward with the thumb of the left hand. This corresponds to a movement away from a hand gripping the rim of the steering wheel 15 in a natural manner beside the left-hand spoke. An upward gear change is achieved by pressing thumb grip 53 with the thumb in the direction of the wheel hub in a movement away from the hand. Deceleration is effected by pressing thumb grip 52 downward with the thumb in a movement towards the hand, while a downward gear change is achieved by pressing thumb grip 54 inward towards the hand. Since the nine or ten o'clock position is the natural and recommended position for placement of the left hand on the steering wheel, with the right hand at two or three o'clock (twelve o'clock representing the top of the wheel), control directions 41–44 afford logical control movements, reductions being effected by pulling movements towards the hand and increases pressure movements away from the hand.

The depressions formed in thumb grips 51–55 offer a natural position for the thumb on the tetrahedral control button 34 for the purpose of performing operations in control directions 41–45. Since the button is also of limited size, the control can be operated in all directions without requiring the driver to alter the grip of his left hand on the steering wheel rim 15. Thus, the control can be operated by relatively small, simple manual adjustments performed solely with the thumb and, by virtue of its location adjacent to the natural position of the hand, facilitates rapid control, enabling the driver to react quickly to traffic situations as they arise.

The sensors used enable the driver to sense directly through his thumb whether the cruise control, upward gear change or downward gear change function has been activated by operation of thumb grips 53–55 since the passage of the pressure point in the particular diaphragm switch can clearly be felt by the thumb. The degree of accelerator control resulting from operation of thumb grips 51–52 can likewise be sensed by the thumb, since this is proportional to the pressure applied. This eliminates the need for the driver to take his eyes from the road, since it is only necessary to locate the steering wheel spoke 12 with the hand and feel the control button 34 with the thumb for the correct thumb grip for the control measure contemplated at that instant.

The natural manoeuvrability of the control with the thumb also ensures that the operation of other control stalks (if any) on the steering column, such as direction indicator, windscreen wiper and, in some cases, lighting controls, can be operated independently. Since control stalks of this type (which do not influence the actual driving of the vehicle) are operated naturally with the digits of the hand other than the thumb, the actions required to operate them are completely different. This enhances driving safety, since a column-mounted driving control lever might easily be operated inadvertently instead of another intended control.

FIG. 4 is a schematic of an arrangement employing the control signals supplied by the control 13, showing the system components required to implement a control method in accordance with the present invention. The arrangement is used in a motor vehicle equipped with an internal combustion engine 1 and a transmission 2–5 to transmit the drive from the engine 1 to the drive wheels 6. The transmission consists of a gearbox 2, a propeller shaft 3, a differential 4 and half shafts 5 driving the drive wheels 6 which, in this instance, are represented by the rear, unsteered wheels. Although the steered front wheels fitted to this particular vehicle are not shown, the invention may, of course, also be applied to front-wheel drive vehicles.

The gearbox 2 may, in the conventional manner, be operated by means of a separate gear lever 32 mounted on the center console or the steering column of the vehicle, and may also be of one of a number of different types. For example, a conventional mechanical stepped gearbox, in which the gear lever 32 is the primary device used to control all gear changing or selection of the lower gears only. A control according to the present invention may be used as a secondary device to control all gear changing or selection of the higher gears only, in which case a computer-controlled, electric or hydraulic motor may be used to engage either fixed mechanical gears or other types of gears in an auxiliary hydraulic gearbox coupled in series with the mechanical gearbox. In other cases, the gearbox may be an automatic hydraulic transmission operated by means of a conventional selector lever 32 in a typical P-R-N-D-2-1 configuration, position D affording automatic changing between first, second and third gear, but using a control according to the present invention to correct gear selection, possibly with the addition of a number of speeds higher than gears 1–3. In the conventional P-R-N-D-2-1 shift configuration, P stands for PARKING, R for REVERSE, N for NEUTRAL, D for DRIVE (automatic forward drive), while positions 2 and 1 are used for permanent engagement of second and first gear respectively. Although this configuration is used primarily in three-speed automatic transmissions, other configurations are available for transmissions such as four speed automatics, in which an additional position, designated 3, permits permanent engagement of third gear. Some automatic transmissions also offer alternative gear-change programmers in which an extra position D may be used to afford sportier performance, higher engine speeds at the gear engagement points, either when changing up or down, or increased engine braking. A control according to the present invention may, however, also be used for manual correction of gear selection in these alternative programs.

The engine 1 of the vehicle is controlled by means of an electrically operated throttle (EST) 16 through a servo device 8. The latter, in turn, is controlled in conventional manner, basically by an accelerator pedal (not shown).

The vehicle is also equipped with a brake servo 10 which controls the operation of the front brakes 31 (not shown) and the rear brakes 30. The brake servo is controlled in conventional manner, basically by a footbrake pedal (not shown).

Control of the arrangement by means of a control according to the present invention is achieved by means of a control unit 7, which performs its secondary function of controlling the servo devices 8–10 for the throttle 16, the gearbox 2 and the brakes 30–31 using a series of signal inputs supplied by a number of sensors 20–28 and manual switching devices 17, 18. The control unit also includes a memory 19 in which at least one vehicle speed control setting may be stored.

All of the sensors 20–28 which supply the control unit 7 with signals are shown in a single block in FIG. 4. Sensor 20 supplies a signal proportional to speed of the vehicle and sensor 21 a signal proportional to the engine speed. Sensor 22 supplies a signal indicating if the ordinary accelerator pedal has been operated and is not in its neutral position, while sensor 23 fulfills the same function for the ordinary brake pedal. Sensor 24 represents diaphragm switch 61 and sensor 25 diaphragm switch 62, which supply signals indicating upward and downward gear changes respectively as initiated by the driver by means of the control 13. Sensor 26 represents strain gauge 60, which supplies a signal proportional to acceleration or deceleration, depending on the degree of bending of the upper arm 35 of the control 13 in response to the pressure applied to the third or fourth thumb grip 53 or 54 respectively. Sensor 27 represents diaphragm switch 63, which supplies a signal when the cruise control function is activated by the driver. Sensor 28 supplies a signal describing the instantaneous angular deviation of the steering wheel 11 from the straight-ahead neutral position.

A clutch pedal sensor is not required since the arrangement described is a typical version of the invention employing an automatic hydraulic transmission or a fully automated mechanical stepped gearbox without a clutch.

Two manual switching devices are also used to control and modify the function of the control unit. One device 18 incorporates a switch 49 for activating and deactivating the control response of the control unit to operation of the control 13. This switch 49 may preferably be of the mechanical or electrical monostable flip-flop type, which switches to the deactivated position, for example when the vehicle ignition is switched off, and can enter the activated mode only when operated intentionally while the ignition remains on. A second switching device 17 is used to enter different vehicle speed control settings in the control unit memory 19. A control switch 40 enables the driver to manually preselect and set different vehicle speed control settings. The control switch may be designed so that simple depression of a control knob, followed by rotation of the knob to a position corresponding to a first control setting and a further, final depression, will transmit and enter the setting in a first memory address 46 in the control unit memory, through switching device 17. Rapid double depression of the knob, followed by rotation to a second control setting and a further final depression, will transmit and enter a second setting in memory address 47. A third control setting may be entered in a third memory address 48 by executing three rapid depressions of the knob and repeating the rest of the foregoing procedure. The number of programmable settings need be limited only by the available memory capacity and by the number considered manageable and usable by the driver.

The first setting may be a low speed limit, such as 50 km/h, the second a higher speed limit, such as 70 km/h, and so on. Some form of display showing the values and sequence of the settings currently used for cruise control should preferably be displayed on the instrument panel. This display may be used primarily to indicate other engine parameters, such as fuel consumption, showing the controlled speed or the speed setting of the cruise control system only while settings are being entered or for a limited period following activation of the cruise control function.

The control 13 itself may be used instead of the switching device 17, 40 to enter new vehicle speed control settings. This is achieved by applying a pressure for longer than normal in control direction 45, whereupon a new value corresponding to the instantaneous speed of the vehicle will be entered. In this case, the speed control setting-first, second or third-to be altered should first be displayed by depressing control 13 in control direction 45 the appropriate number of times.

The control unit 7 incorporates a function whereby the throttle servo 8, the gear-change servo 9 and the brake servo 10 are actuated only secondarily in response to operation of the control 13, provided also that certain other conditions are satisfied. A first condition is that the switching device 18 is switched on by activation of the switch 49 while the ignition 33 is also switched on. Thus, the aforementioned control unit function is automatically disconnected when the vehicle is started, affording the driver the option of not actuating or completely disabling actuation of the servo devices 8–10 by the control 13.

A second condition is that the ordinary accelerator and brake pedals must not be operated i.e. the pedals must be in the neutral position as detected by sensors 22 and 23. This enables the driver to immediately disable actuation of the servos 8–10 by the control unit in response to operation of the control 13, for example, in an emergency traffic situation in which it is necessary to brake heavily or accelerate rapidly with the aid of the pedals.

A third condition is that the steering wheel travel must not be such that the control 13 is operated inadvertently by possible movement of the right hand towards wheel spoke 12, which is located initially on the left when the wheel is in the straight-ahead position. To prevent this, the position of the steering wheel 11 is detected by a steering position sensor 28 which, on rotation of the wheel beyond a threshold position between 90 and 180 degrees from the initial position, will inhibit and, if necessary, disable actuation of the servos 8–10 by the control unit in response to operation of the control 13.

A fourth condition is that the engine must be running, as detected by the engine speed sensor 21.

A fifth condition, which may be applied for reasons of safety, may consist of a vehicle speed setting, for example a threshold value between 20 and 40 km/h, below which the control unit 7 control function is disabled. This prevents sudden acceleration or accidental gear changing if the control 13 is operated inadvertently immediately on starting or when the vehicle is being operated slowly and with extreme caution due to prevailing traffic conditions. A vehicle speed sensor 20 is used to supply the control unit 7 with signals enabling it to verify that the fifth condition has been satisfied.

Certain safety conditions can be monitored by the servo devices 8–10 when these are being controlled only secondarily by the control unit 7. For example, the reception of secondary control signals from the control unit by the gear-change servo 9 may be completely inhibited by manual engagement of a gear by means of the gear lever 32, or engagement of reverse or positions other than D in an automatic transmission. For further enhanced safety, the conditions may be verified by both the control unit 7 and each of the servo devices 8–10 individually.

The control 13 actuates the servo devices 8–10 through the control unit 7 in the following manner, provided that the foregoing conditions are satisfied: if pressure is applied to thumb grip 51 of the control in control direction 41, sensor 26, 60 will deliver an acceleration signal proportional to the pressure. This signal is detected by the control unit 7 and is used to actuate the accelerator servo, opening the throttle by a corresponding amount. When the driver releases the control after the desired increase in speed has been achieved, the instantaneous speed of the vehicle is automatically stored as a temporary setting in a memory in the control unit 7, which then controls the accelerator servo so as to maintain the speed of the vehicle at this value. If pressure is applied to thumb grip 52 of the control in control direction 42, sensor 26, 60 will deliver a deceleration signal proportional to the pressure. This signal is detected by the control unit 7 and is used primarily to actuate the accelerator servo, closing the throttle by a corresponding amount. However, the signal from sensor 26, 60 already corresponds to fully closed throttle in an intermediate position between the neutral position of the control 13 and full travel in control direction 42. The control unit 7 then compares the current signal from sensor 26, 60 with a preset reference signal, corresponding to closed throttle, stored in its own memory. When the signal from sensor 26, 60 exceeds the reference value, the control unit 7 also actuates the brake servo 10 so that a braking force is applied to the front and rear wheels 31 and 30 respectively of the vehicle. The control unit 7 controls the brake servo 10 so that the braking effort applied is proportional to the signal from sensor 26, 60 and the amount by which it exceeds the reference signal. When the driver releases the control after the desired decrease in speed has been achieved, the instantaneous speed of the vehicle is automatically stored as a temporary setting in a memory in the control unit 7, which then controls the accelerator servo so as to maintain the speed of the vehicle at this value. Cruise control using this temporary control setting may be overridden temporarily when a control action such as operation of the accelerator or brake pedal, or another gear-change operation by means of the control 13 or the gear lever 32, is performed, or if the engine cannot maintain the speed under the prevailing load conditions. However, the temporary speed control setting may be reactivated if, for example, the control 13 is actuated by simple depression in control direction 45.

The accelerator control function in the control 13 may thus be used for fine adjustment of the vehicle speed. In this context, the term 'fine adjustment' signifies that the driver can adjust and maintain the speed of the vehicle after operation of the function without the necessity of operating the control continuously, provided that the other relevant conditions are satisfied.

One depression of thumb grip 53 on the control 13 in control direction 43 will cause sensor 24, 61 to deliver a signal pulse when the pressure point in diaphragm switch 61 is passed, corresponding to a signal initiating a single upward gear-change. On detecting the signal from sensor 24, the control unit 7 actuates the gear-change servo 9 to select the next highest gear in relation to that engaged at the particular instant. Two rapid depressions in control direction 43 will cause the control unit 7 to actuate the gear-change servo 9 to change up two gears. In similar manner, downward gear changing is achieved by applying pressure to thumb grip 54 of the control in control direction 44.

One depression of thumb grip 55 on the control 13 in control direction 45 will cause sensor 27, 63 to deliver a signal pulse when the pressure point in diaphragm switch 63 is passed, corresponding to a signal initiating cruise control at a preset speed setting. On detecting the signal and the number of signal pulses from sensor 27, the control unit 7 actuates the accelerator servo 8, using a first preset speed control setting to determine the servo opening when one signal pulse is detected and a second preset setting when two signal pulses are detected. The speed control settings are stored in the memory 19 of the control unit 7, in which they may be entered, for example, with the aid of switching device 17, 40.

The control unit may consist ideally of a microprocessor designed specifically for the purpose, including a CPU, an interface as required in instances in which the input/output signals are not directly compatible with the CPU or the servos 8–10, and memories of both the ROM and RAM type. The control functions of the control unit 7 are stored in the form of a program in a non-volatile storage memory. The program incorporates interrupt functions which enable the control conditions for the control unit to be monitored continuously. The temporary speed settings which are adopted automatically when the accelerator control in the control 13 is released in control directions 41, 42 may ideally be stored in a volatile storage memory, which is erased/zeroed when the ignition is switched off. The speed settings entered with the aid of switching device 40, 17 may preferably be stored in memories which are not erased when the ignition is switched off. The software may also incorporate safety functions which inhibit the engagement of a gear which may cause the engine 1 to race or stall, as well as various accelerator control functions which may be utilised as determined by the prevailing speed of the vehicle, the gear selected and the magnitude of the instantaneous deviation in vehicle speed from the control setting used by the cruise control function following its activation.

The control signals supplied by the control unit 7 to the servo devices 8–10 are also processed as secondary in systematic terms and cannot override the servo control functions as governed by the appropriate primary controls, such as the accelerator and brake pedals or the gear lever.

In practice, the present invention may conveniently be used in combination with a conventional set-up of driving controls, finding its main application in long-distance driving, in which the vehicle may be driven very easily, using a minimum of control actions, wholly in accordance with the wishes of the driver and readily adaptable to prevailing traffic conditions.

The above description of one version of a control, arrangement and method of controlling the driving of a motor vehicle according to the present invention should not be regarded as restricting the basic concept of the invention as disclosed in the appended Claims. The invention may, without infringing the spirit or scope of said Claims, instead of the tetrahedral button, employ a cluster of switches arranged within a finite operating area on the steering wheel, the switches being mounted adjacent one another and supplying, possibly without perceptible physical movement, corresponding control signals for the accelerator and gear-change functions, and for the activation of several cruise control functions.

A rotary control designed to rotate about an axis parallel to the third and fourth control directions in the embodiment already described may be used as an alternative to the tetrahedral button 34. A control of this type may take the form of a short cylinder mounted essentially within the steering wheel spoke, with part of the peripheral surface (preferably knurled) projecting above the upper surface of the spoke. To control acceleration, the control may rotate about its axis, in the first and second control directions, in opposition to spring-loaded devices. To control the gear-change and cruise control functions, the entire control may be operable, in the third, fourth and fifth control directions, in opposition to pressure-point generating devices. Portions of the peripheral surface of the control may, if required, also project below the underside of the wheel spoke to permit operation by digits other than the thumb.

As an alternative to the location of the control on a spoke which connects the rim of the steering wheel with the hub, as proposed in the version described, the control may be mounted on the outer end of a spoke which rotates together with the hub and extends outwards towards the rim, but which is not actually connected to the rim. This extra spoke may be made adjustable in different rotary and vertical positions in relation to the plane of the rim to suit the needs of individual drivers. Furthermore, control directions other than the configuration proposed in the version of the present invention described in the foregoing may be considered more natural, depending on the point at which the wheel spoke 12 is connected to the rim 15.

We claim:

1. A control for controlling the operation of a motor vehicle, the vehicle having an engine with a throttle, an accelerator control for operating the throttle, a transmission with a gearbox and a vehicle steering wheel;

the control having first, second and third servo devices connected to the control; the first servo device being connected to the accelerator control of the vehicle; the second servo device being connected to the gearbox of the transmission; the third servo device being for controlling the engine throttle;

the steering wheel including a rim and spokes; the control being mounted on the steering wheel of the motor vehicle on at least one of the spokes adjacent the rim, at a location to be manually operable by the driver's fingers while the driver's hand having the operating fingers maintains its grip on the steering wheel;

the control further comprising:

first signal generating means responsive to a first manual operation by the driver's finger for transmitting a first control signal to the first servo device for the accelerator control;

second signal generating means responsive to a second manual operation by the driver's finger for transmitting a second control signal to the second servo device to initiate and execute changing of gears in the vehicle transmission gearbox; and third signal generating means responsive to a third manual operation by the driver's finger for generating a third control signal to the third servo device representative of a speed at which it is desired to maintain the vehicle for the throttle to be set to maintain the desired speed;

a control element movable in response to the driver's finger in first, second, third, fourth and fifth control directions, and in which the first signal generating means is responsive to movement of the control element in either of the first and second directions, the second signal generating means is responsive to movement of the control element in either of the third and fourth directions, and the third signal generating means is responsive to movement of the control element in the fifth direction.

2. A control according to claim 1, in which the first and second control directions are substantially at right angles to a radius of the steering wheel.

3. A control according to claim 2, in which the third and fourth control directions are substantially at right angles to the first and second directions and substantially parallel to the radius of the steering wheel.

4. A control according to claim 3, in which the fifth control direction is substantially at right angles to the plane of the steering wheel.

5. A control according to claim 1, in which the control element is responsive to pressure from the driver's finger in the first and second control directions to move the control element from a neutral position in the first and second directions, respectively, the control element being structured and arranged such as to return to the neutral position when such pressure is removed.

6. A control according to claim 1, in which the control element is mounted for pivoting motion in the third and fourth control directions and is responsive to pressure from the driver's finger in the third and fourth control directions to pivot away from a neutral position in the third and fourth directions; and in which the second signal generating means is responsive to respective predetermined amounts of movement in the third and fourth control directions and includes means for returning the control element to its neutral position upon removal of such pressure, the control element including means for providing a sensory response to the driver's finger when the control element has moved the respective predetermined amounts in the third and fourth control directions.

7. A control according to claim 1, in which the control element includes a substantially tetrahedral button with four concave side surfaces, the opposite surfaces being arranged respectively in pairs parallel to the first and second control directions, and to the third and fourth control directions so that the tetrahedral button is operable for movement in the first, second, third and fourth directions in a plane substantially parallel to the plane of the steering wheel, the tetrahedral button further including a truncated top surface with a concave depression in the fifth control direction.

8. An arrangement for controlling a motor vehicle having an engine, drive wheels driven by the engine and a gearbox installed between the engine and the drive wheels of the vehicle, the vehicle engine also including a throttle, and the vehicle including a steering wheel; the arrangement comprising:

first and second servo devices respectively for controlling acceleration of the engine by controlling operation of the throttle and for controlling the gear box;

an operating unit mounted on the steering wheel at a location to be manually operable by the driver's fingers while the driver's hand having the operating fingers maintains its grip on the steering wheel; the operating unit including first and second pressure sensors, the first pressure sensor being operable in response to pressure by the driver's finger representing a desired change in acceleration to generate a first electrical signal and the second pressure sensor being operable in response to pressure by the driver's finger representing a desired change of gears to generate a second electrical signal; and control means responsive to the first electrical signal for actuating the first servo device to control acceleration of the engine and responsive to the second electrical signal for actuating the second servo device to control operation of the gearbox to initiate and execute gear changes;

a memory unit containing a plurality of speed control settings and the operating unit including a third pressure sensor responsive to pressure from the driver's finger for generating a third electrical signal representative of one of the speed control settings stored in the memory unit, the arrangement being responsive to the third electrical signal and the memory unit for actuating the first servo to maintain the speed of the vehicle at the selected speed setting.

9. An arrangement according to claim 8, further including means for enabling entry of the plurality of speed control settings in the memory unit.

10. An arrangement according to claim 9, including means connected with the steering wheel for disabling control of the servo devices in response to rotation of the steering wheel beyond a threshold position within a sector between 90° and 180° from the straight ahead position of the steering wheel.

11. An arrangement according to claim 10, further including means enabling the driver to manually disable the response of the servo devices to operation of the operating unit.

12. A control for controlling the operation of a motor vehicle, the vehicle having an engine with a throttle, an accelerator control for operating the throttle, a transmission with a gearbox and a vehicle steering wheel;

the control having first and second servo devices connected to the control; the first servo device being connected to the accelerator control of the vehicle; the second servo device being connected to the gearbox of the transmission;

the steering wheel including a rim and the control being mounted on the steering wheel adjacent the rim at a location to be manually operable by the driver's fingers while the driver's hand having the operating fingers maintains its grip on the steering wheel;

the control further comprising:

first signal generating means responsive to a first manual operation by the driver's finger for transmitting a first control signal to the first servo device for the accelerator control; and second signal generating means responsive to a second manual operation by the driver's finger for transmitting a second control signal to the second servo device to initiate and execute changing of gears in the vehicle transmission gearbox;

the control comprises a control element moveable in response to the driver's finger in first and second and in third and fourth control directions, the first signal generating means being responsive to movement of the control element in either of the first and second directions, and the second signal generating means being responsive to movement of the control element in either of the third and fourth directions.

13. A control according to claim 12, wherein the first and second directions are opposite each other and the third and fourth directions are opposite each other and also are at right angles to the first and second directions.

14. A control according to claim 12 wherein the control element is also movable in response to the driver's finger in a fifth control direction;

and third signal generating means responsive to a third manual operation by the driver's finger for generating a third control signal to the third servo device representative of a speed at which it is desired to maintain the vehicle for the throttle to be set to maintain the desired speed; and the third signal generating means being responsive to movement of the control element in the fifth direction.

15. A control according to claim 14, wherein the first and second directions are opposite each other, the third and fourth directions are opposite each other and are at right angles to the first and second directions, and the fifth direction is at right angles to both of the first and second directions and the third and fourth directions.

16. An arrangement for controlling a motor vehicle having an engine with a throttle, drive wheels for being driven by the engine and a gearbox installed between the engine and the drive wheels of the vehicle, the vehicle also including a steering wheel for steering the vehicle, the steering wheel having a rim, the arrangement comprising:

an operating unit mounted on the steering wheel at a location to be accessible for operation by the driver's fingers while the driver's hand having the fingers grips the steering wheel, the operating unit including first, second, third and fourth finger grips thereon each individually respectively operable by the driver's fingers, means connected to each of the finger grips for generating a respective first, second, third and fourth electrical signal proportional to the amount of pressure applied to the respective finger grips;

control means, including a first servo device connected with the first and second finger grips for receiving the first and second electrical signals and being connected with the throttle for controlling engine acceleration; the connections between the first and second finger grips, the first servo device and the throttle being such that operating the first finger grip increases acceleration of the vehicle and operating the second finger grip decreases acceleration of the vehicle;

a second servo device connected with the third and fourth finger grips for receiving the third and fourth electrical signals therefrom and being connected with the gearbox for initiating and executing gear changes in the gearbox; the connections between the third and fourth finger grips, the second servo device and the gearbox being such that operating the third finger grip operates the second servo device to cause an upward gear change in the gearbox while operating the fourth finger grip operates the second servo device to cause a downward gear change in the gearbox.

17. The arrangement of claim 16, wherein the first servo device maintains the speed of the vehicle at the speed it was travelling when pressure is removed from either of the first and second finger grips.

18. The arrangement of claim 17, wherein the vehicle further includes a brake; the first servo device being connected with the brake for being operated to activate the vehicle brake;

the first servo device having a threshold value for pressure applied to the second finger grip, such that pressure up to a threshold value applied on the second finger grip causes the first servo device to close the throttle while pressure applied to the second finger grip above the threshold value causes the first servo device to activate the vehicle brake to a degree related to the extent to which the pressure applied to the second grip exceeds the threshold value of pressure.

19. The arrangement of claim 18, further comprising a fifth finger grip on the operating unit and a third servo device connected with the fifth finger grip for setting the throttle to cause the vehicle to travel at a predetermined speed setting.

20. The arrangement of claim 19, wherein the third servo is operable by operating the fifth finger grip a selected number of times, the number of times the fifth finger grip is operated corresponding to a predetermined speed setting.

* * * * *